US006159052A

United States Patent [19]

Meng et al.

[11] Patent Number: 6,159,052

[45] Date of Patent: Dec. 12, 2000

[54] ELECTRICAL CONNECTOR

[75] Inventors: Ching-Chang Meng; Chu-Mei Chen, both of Taipei; Richard Lu, Hsi-Chih, all of Taiwan

[73] Assignee: Hon Hai Precision Ind. Co., Ltd., Taipei Hsien, Taiwan

[21] Appl. No.: 09/316,626

[22] Filed: May 21, 1999

[30] Foreign Application Priority Data

Oct. 30, 1998 [TW] Taiwan ................................ 87217996

[51] Int. Cl.[7] ..................................................... H02R 24/00

[52] U.S. Cl. ........................... 439/633; 439/489; 439/681

[58] Field of Search .................................... 439/633, 637, 439/507, 510, 513, 680, 678, 509, 188, 189, 489, 681

[56] References Cited

U.S. PATENT DOCUMENTS

| | | | |
|---|---|---|---|
| 3,160,459 | 12/1964 | Greco et al. | 439/633 |
| 3,566,340 | 2/1971 | Jayne et al. | 439/633 |
| 3,673,548 | 6/1972 | Mattingly, Jr. et al. | 439/633 |
| 4,927,787 | 5/1990 | Patel | 439/189 |
| 5,387,132 | 2/1995 | Saver et al. | 439/633 |
| 5,688,147 | 11/1997 | Coteus et al. | 439/681 |
| 6,017,248 | 1/2000 | Pan et al. | 439/681 |

*Primary Examiner*—T. C. Patel

*Attorney, Agent, or Firm*—Wei Te Chung

[57] ABSTRACT

An electrical connector adapted to be mounted to a mother board, includes a casing defining a slot therein for receiving a daughter board and a plurality of pin pairs arranged in the slot for electrically engaging with the daughter board. The casing has a fixed member fixed in the slot and a switch key selectively fit into the slot at two locations corresponding to a 3.3V PCI connector and a 5V PCI connector. Thus, the connector may be selectively configured to be either a 3.3V PCI connector or a 5V PCI connector by setting the position of the switch key. The insertion of the switch key into the slot changes the spatial relationship between a pair of pins thereby transmitting a signal to the mother board for selecting the electrical voltage supplied to the connector corresponding to the configuration of the connector.

10 Claims, 9 Drawing Sheets

ELECTRICAL CONNECTOR

BACKGROUND OF THE INVENTION

1. Field of the Invention

The present invention generally relates to an electrical connector, and in particular to a Peripheral Component Interconnect (PCI) connector which can be used with both 3.3V and 5V operational voltages.

2. The Prior Art

Expansion of a computer mother board by selectively connecting daughter boards thereto is a commonly employed technique of the computer industry. A daughter board is fit into a connector mounted on the mother board. A common type of connector for connecting a daughter board to a mother board is a Peripheral Component Interconnect (PCI) connector.

The PCI connector has two different types respectively operational at different voltage systems, namely 3.3V and 5V. To avoid connection of a daughter board of a first voltage system to a PCI connector of a second voltage system thereby damaging the daughter board, the 5V PCI connector is configured differently than the 3.3V PCI connector by positioning a distinguishing member at different locations in the connectors. Thus, mistaken connection between a mother board and a daughter board of different operational voltages is effectively elinated.

FIGS. 5A and 5B of the attached drawings show the 3.3V and 5V PCI connectors of the prior art, respectively. The 3.3V PCI connector, designated by reference numeral 5, comprises an elongate slot 51 for receiving a corresponding daughter board 6. The connector 5 has first and second partition blocks 52, 53 fixed in the slot 51 and spaced from each other. The daughter board 6 comprises two notches 61 defined in an edge thereof for engaging the partition blocks 52, 53 when the daughter board 6, is inserted into the slot 51.

The 5V PCI connector, designated by reference numeral 5', also comprises an elongate slot 51'. First and second partition blocks 52', 53' are formed in the slot 51' and spaced from each other. The daughter board 6 to be received in the slot 51' defines two notches 62 corresponding to the partition blocks 53', 52'. The first partition block 52' of the 5V PCI connector 5' is located at the same position as the first partition block 52 of the 3.3V PCI connector 5, while the second partition blocks 52', 52 of the two connectors 5', 5 are located at different positions. Thus, the second partition blocks 52', 52 serve as means to identify the voltage system associated with the connector thereby preventing inaccurate connection.

Such a design, however, increases the cost for both connector and computer manufacturers and suppliers since the different connectors must be separately manufactured and stocked.

It is thus desirable to have a PCI connector structure that is convertible and applicable to both 3.3V and 5V voltage systems.

SUMMARY OF THE INVENTION

Accordingly, an object of the present invention is to provide an electrical connector which is convertible to different configurations associated with different operational voltages.

Another object of the present invention is to provide an electrical connector comprising a switch key that can be selectively set at different locations for engaging circuit boards of different specifications.

A further object of the present invention is to provide an electrical connector that selectively engages circuit boards having different configurations thereby reducing the cost of stocking and manufacturing connectors having different specifications.

To achieve the above objects, an electrical connector in accordance with the present invention comprises a casing defining a slot therein for receiving a daughter board and a plurality of pin pairs arranged in the slot for electrically engaging with the daughter board. The casing has a fixed member fixed in the slot and a switch key selectively fit into the slot at two locations corresponding to a 3.3V PCI connector and a 5V PCI connector. Thus, the connector may be selectively configured to be either a 3.3V PCI connector or a 5V PCI connector by setting the position of the switch key. The insertion of the switch key into the slot changes the spatial relationship between a pair of pins, thereby transmitting a signal to the mother board for selecting the electrical voltage supplied to the connector corresponding to the configuration of the connector.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1A:
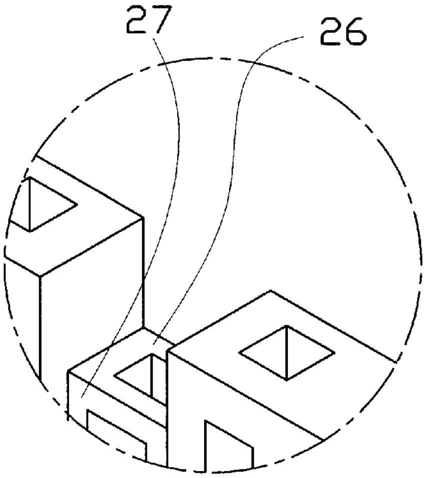
FIG. 1A an enlarged view of the circled portion marked 1A in FIG. 1.
Figure 1:
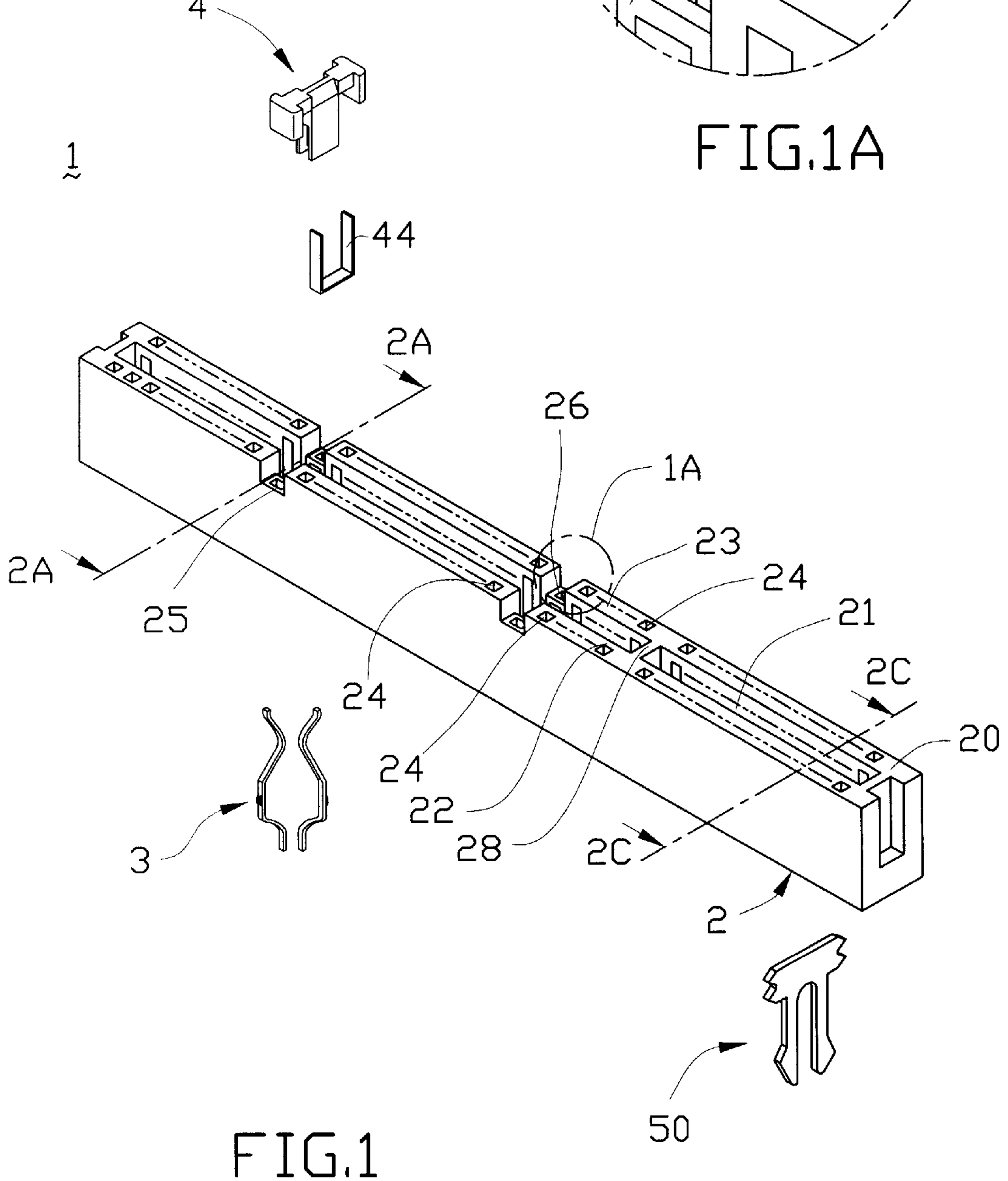
FIG. 1 is a perspective view of an electrical connector constructed in accordance with a first embodiment of the present invention.

Referring to the drawings and in particular to FIG. 1, wherein an electrical connector constructed in accordance with a first embodiment of the present invention, generally designated by reference numeral 1, is shown, the connector 1 comprises an elongate casing 2 made of nonconductive material. The casing 2 has a first face 20 through which an elongate slot 21 is defined. The slot 21 is adapted to receive a daughter board (not shown in FIG. 1). A plurality of conductive pin pairs 3 are received and retained in the slot 21 and longitudinally spaced along the slot 21. The casing 2 comprises two side walls 22, 23 on opposite sides of the slot 21. Each side wall 22, 23 defines a plurality of apertures 24 therein.

Figure 2A:
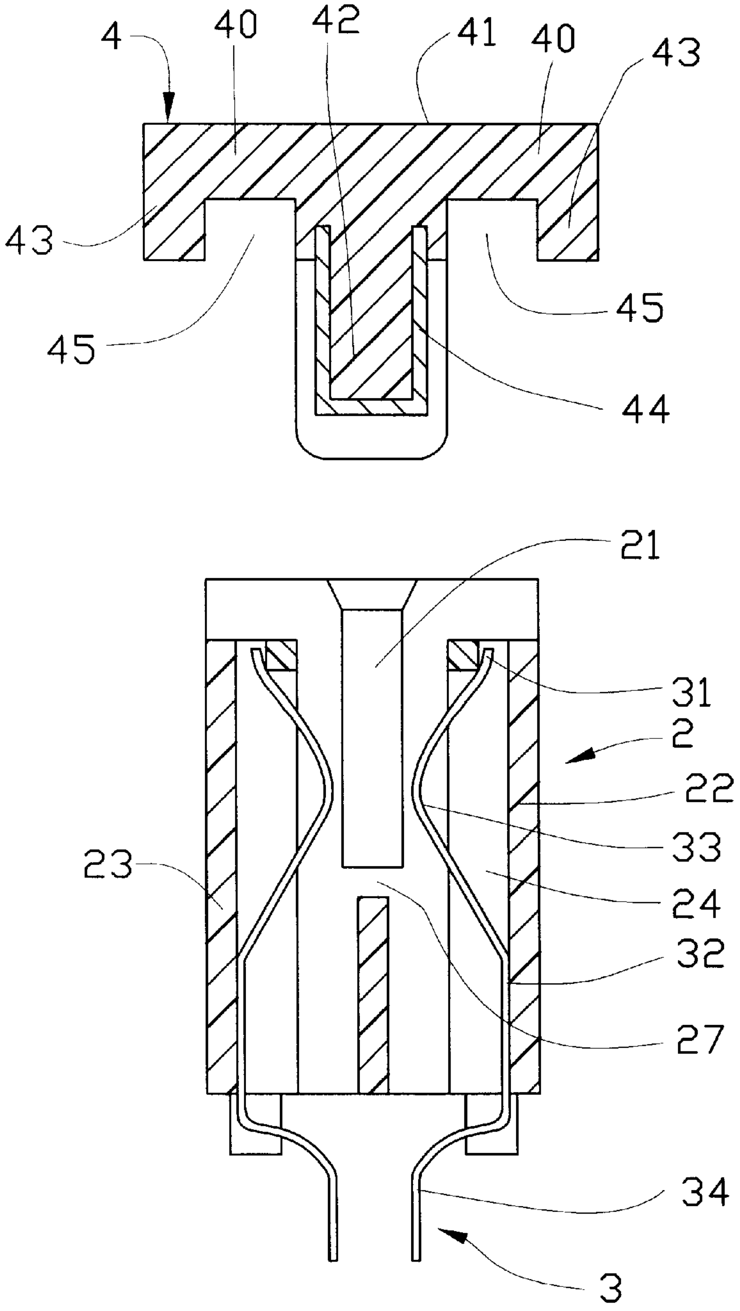
FIG. 2A is a cross-sectional view taken along line 2A—2A of FIG. 1, wherein a switch key is detached from the connector.
Figure 2B:
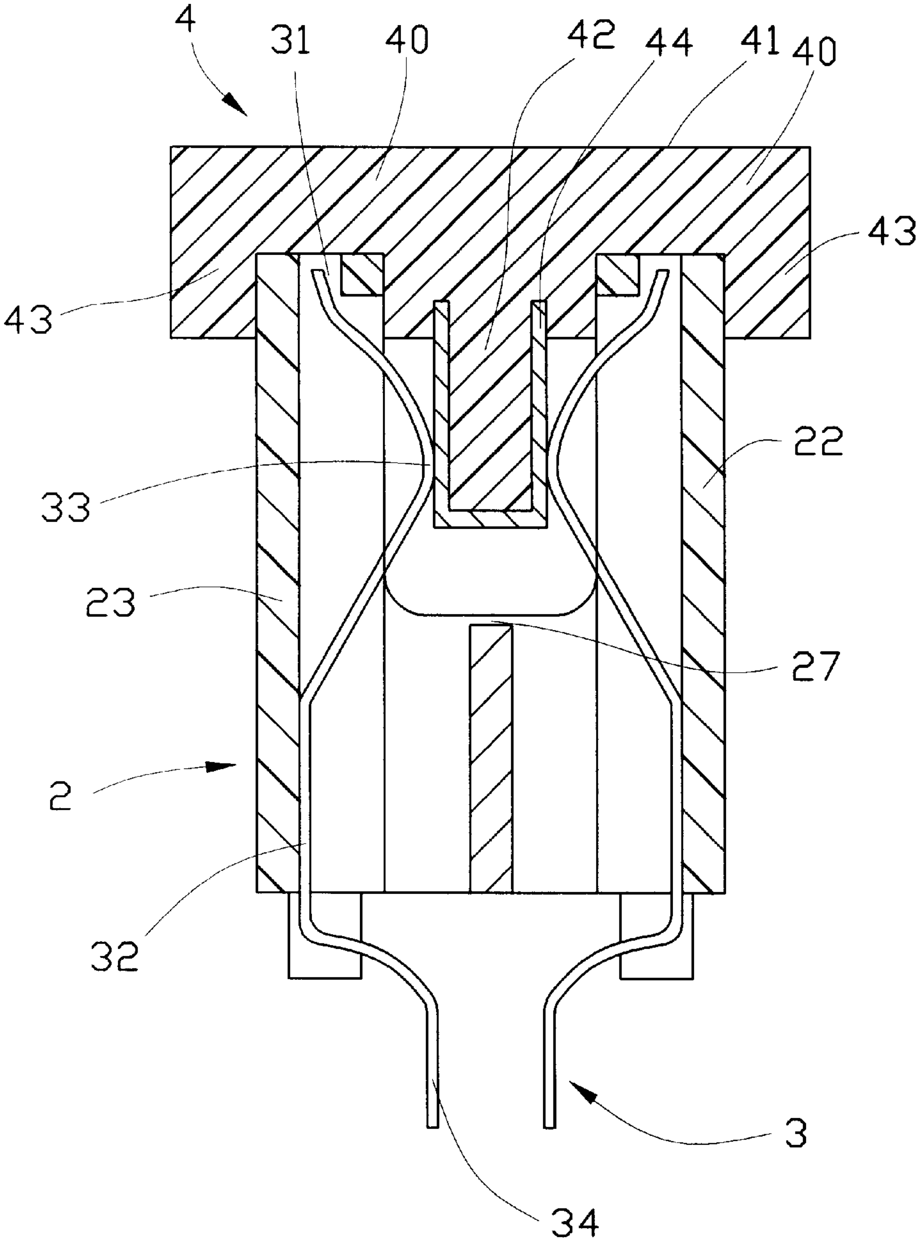
FIG. 2B is a cross-sectional view similar to FIG. 2A but with the switch key fit in the connector.
Figure 2C:
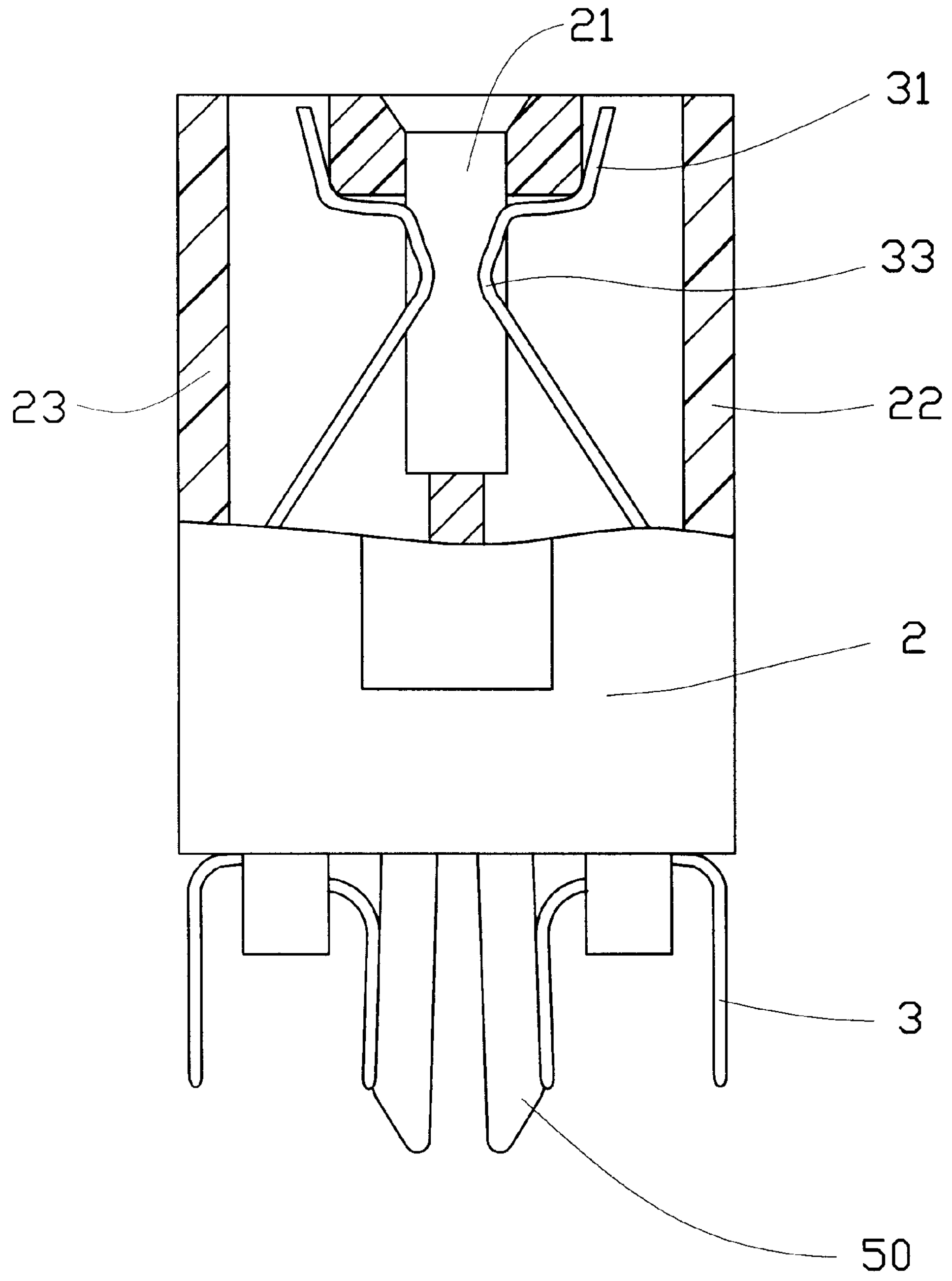
FIG. 2C is a cross-sectional view taken along line 2C—2C of FIG. 1.

With reference to FIGS. 2A, 2B and 2C, each pin of the pin pair 3 comprises a first end 31 received in the corresponding aperture 24 of the side wall 22, 23, a base section 32 supported by the side wall 22, 23 and a second end 34 extending beyond a second face of the casing 2 opposite the first face 20. The second end 34 of the pin is adapted to be soldered to a mother board (not shown). The pin also comprises an arcuate section 33 extending into the slot 21 for electrically engaging the daughter board.

Figure 5A:
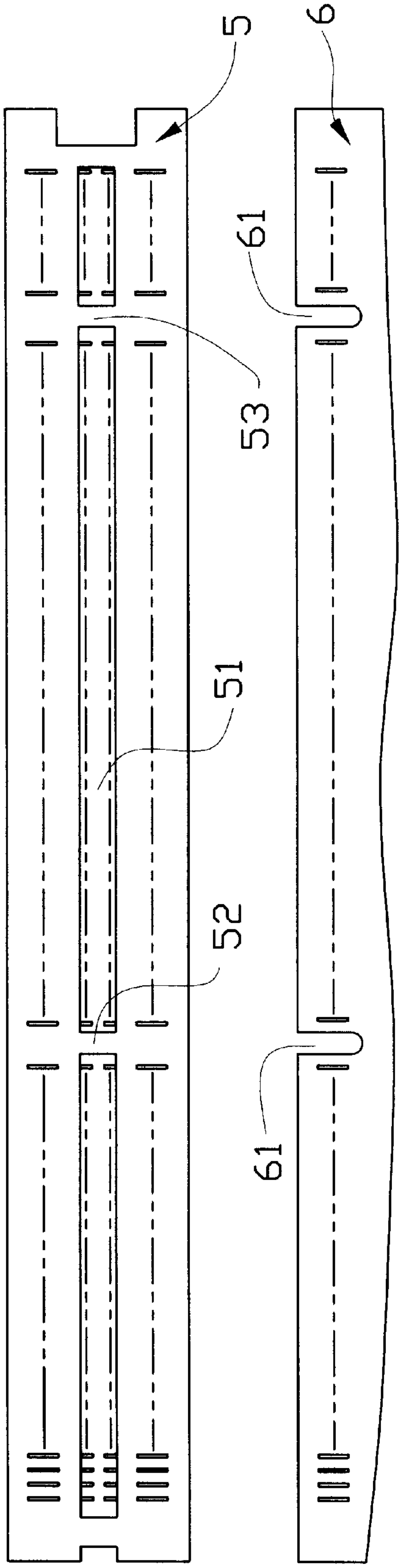
FIG.5A (PRIOR ART)
FIG. 5A is a plan view of a conventional 3.3V PCI connector and a daughter to be inserted therein.
Figure 5B:
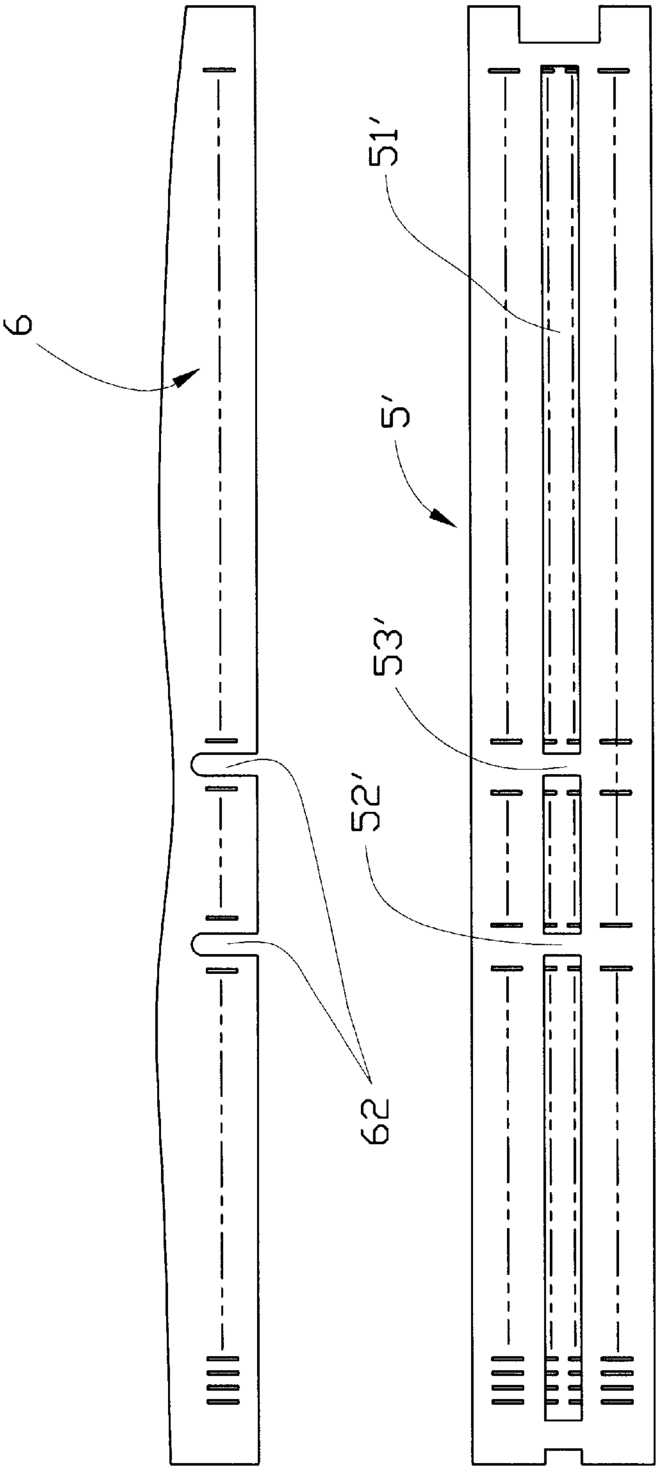
FIG.5B (PRIOR ART)
FIG. 5B is a plan view of a conventional 5V PCI connector and a daughter to be inserted therein.

The first face 20 of the casing 2 is provided with two transverse slots 25, 26 located at positions corresponding to the second partition blocks 53, 53' of the conventional 3.3V and 5V PCI connectors 5, 5' shown in FIGS. 5A and 5B. As shown in FIG. 1A, each slot 25, 26 includes a pair of aligned recesses defined in the side walls 22, 23. For convenience, the recesses will be designated by the same reference numeral as the slot associated therewith. Preferably, a vertical groove 27 is defined on an inner face of the side wall 22, 23 in communication with each of corresponding recess of the slot 25, 26 to define a pair of key ways between the side walls 22, 23. For convenience, the key ways will be designated by the same reference numeral as the grooves thereof.

A switch key 4, made of nonconductive material, comprises a T-shaped body 41 having a base 42 insertable into the slot 21 and preferably partially received in the key way 27 to precisely position the switch key 4 within the casing 2. The switch key 4 further comprises two opposite arms 40 extending through the recesses 25, 26 of the side walls 22, 23 and supported therein. Preferably, a flange 43 is formed at a free end of each arm 40. A notch 45 is defined in a bottom face of the arm 40 between the base 42 and each flange 43. The notch 45 is received in the corresponding recess 25, 26 and the flange 43 extends beyond and engages with the corresponding side wall 22, 23. The switch key 4 is selectively fit into the slots 25, 26 to simulate the partition blocks 53, 53' of the conventional PCI connectors 5, 5'.

One aperture is defined in each recess for receiving one of the pin pairs 3 in each slot 25, 26, as shown in FIG. 2A. The pins of the pin pairs 3 associated with the transverse slots 25, 26 are spaced from each other and have a normally open configuration.

The switch key 4 comprises a conductive member 44 fixed to the base 42 thereof. In the embodiment illustrated, the conductive member 44 is a U-shaped member fit over a free end of the base 42. Insertion of the switch key 4 into the key way 27 of the slot 21 of the casing 2 causes the arcuate sections 33 of the pin pair 3 to be engaged by the conductive members 44 (FIG. 2B) thereby electrically connecting the pin pair 3 together. A signal is thus generated and transmitted to the mother board on which the connector 1 is mounted. The signal determines the voltage supplied from the mother board to the connector 1 corresponding to the operational voltage of the daughter board to be received in the connector 1.

The casing 2 may also comprise a partition member 28 fixed in the slot 21 at a position corresponding to the first partition block 52, 52' of the conventional PCI connector 5, 5'.

The casing 2 also comprises board locks 50 (FIGS. 1 and 2C) which extend beyond the second face of the casing 2 and engage holes defined in the mother board to fix the casing 2 thereto.

Figure 3:
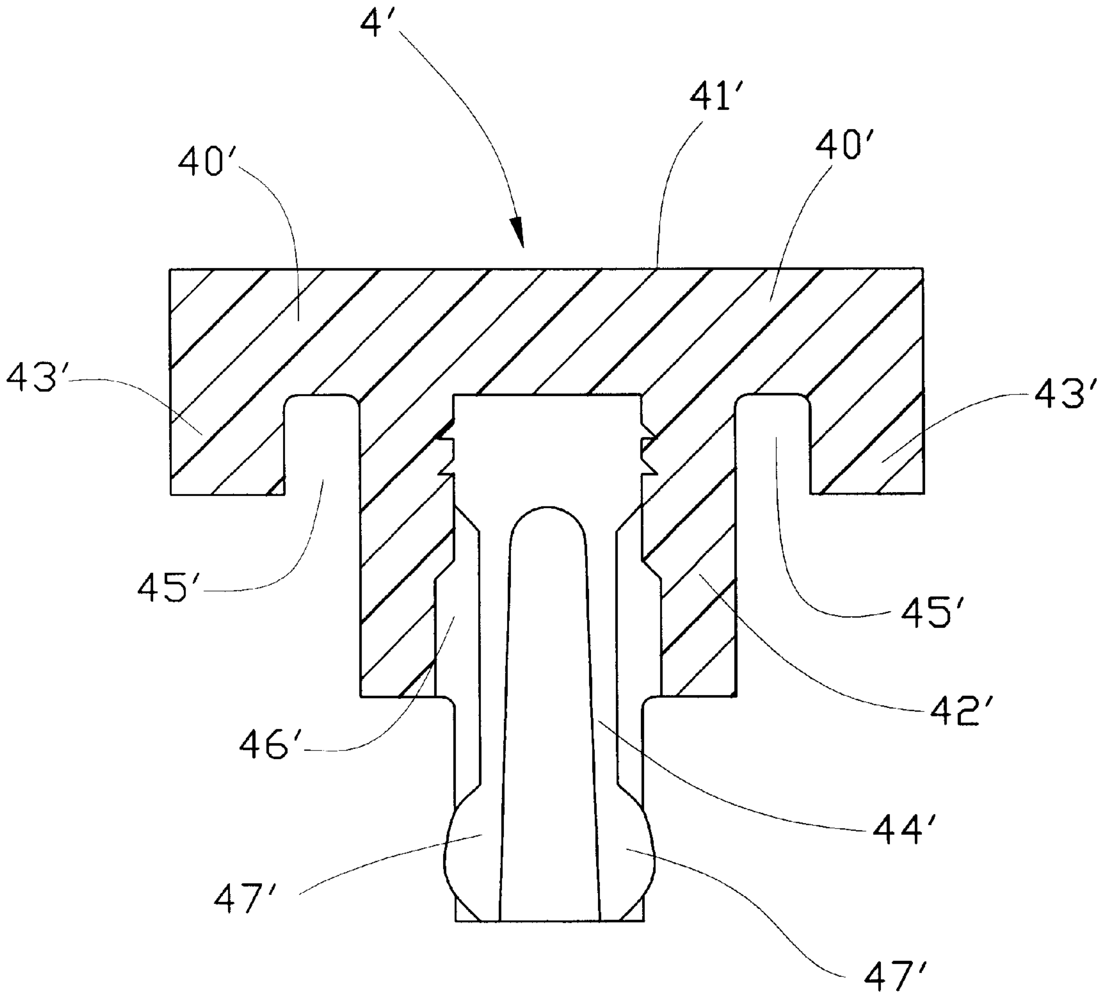
FIG. 3 is a cross-sectional view of a switch key in accordance with a second embodiment of the present invention.

FIG. 3 shows another embodiment of a switch key in accordance with the present invention. The switch key designated by reference numeral 4', comprises a T-shaped body 41' having a base 42' and two opposite arms 40'. Each arm 40' forms a flange 43' on a free end thereof. A notch 45' is defined in a bottom face of the arm 40' to be received in the corresponding recesses 25, 26 of the side walls 22, 23 of the casing 2.

The base 42' has a central bore 46' into which a conductive member 44' is fit. The conductive member 44' has two sideways projections 47' engageable with the pin pair 3 associated with the transverse slot 25, 26. Similar to the first embodiment shown in FIG. 1, the insertion of the switch key 4' into the appropriate slot 25, 26 sets the configuration of the connector 1 and electrically connects the pin pair 3 together.

Figure 4A:
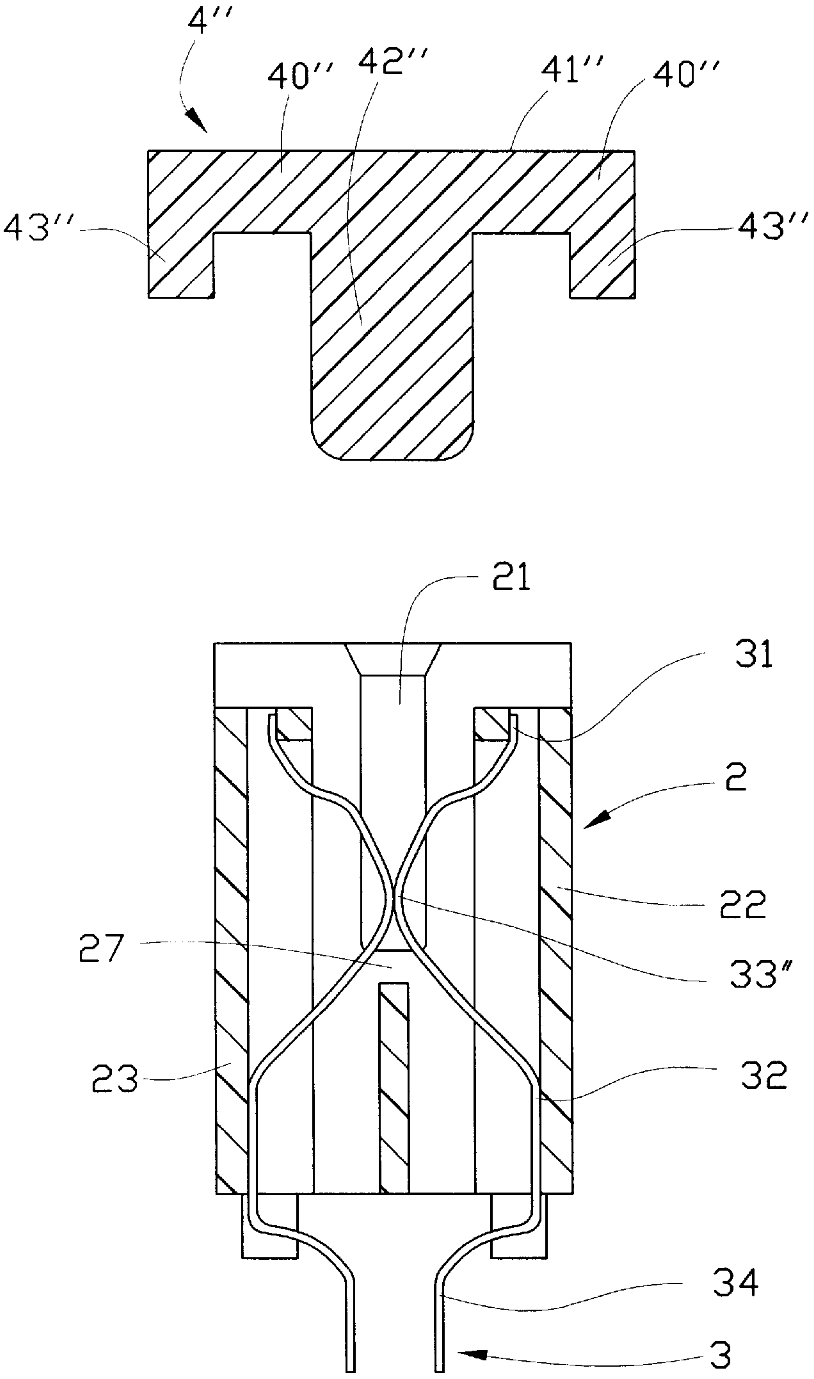
FIG. 4A is a cross-sectional view of an electrical connector constructed in accordance with a third embodiment of the present invention with the switch key detached therefrom.
Figure 4B:
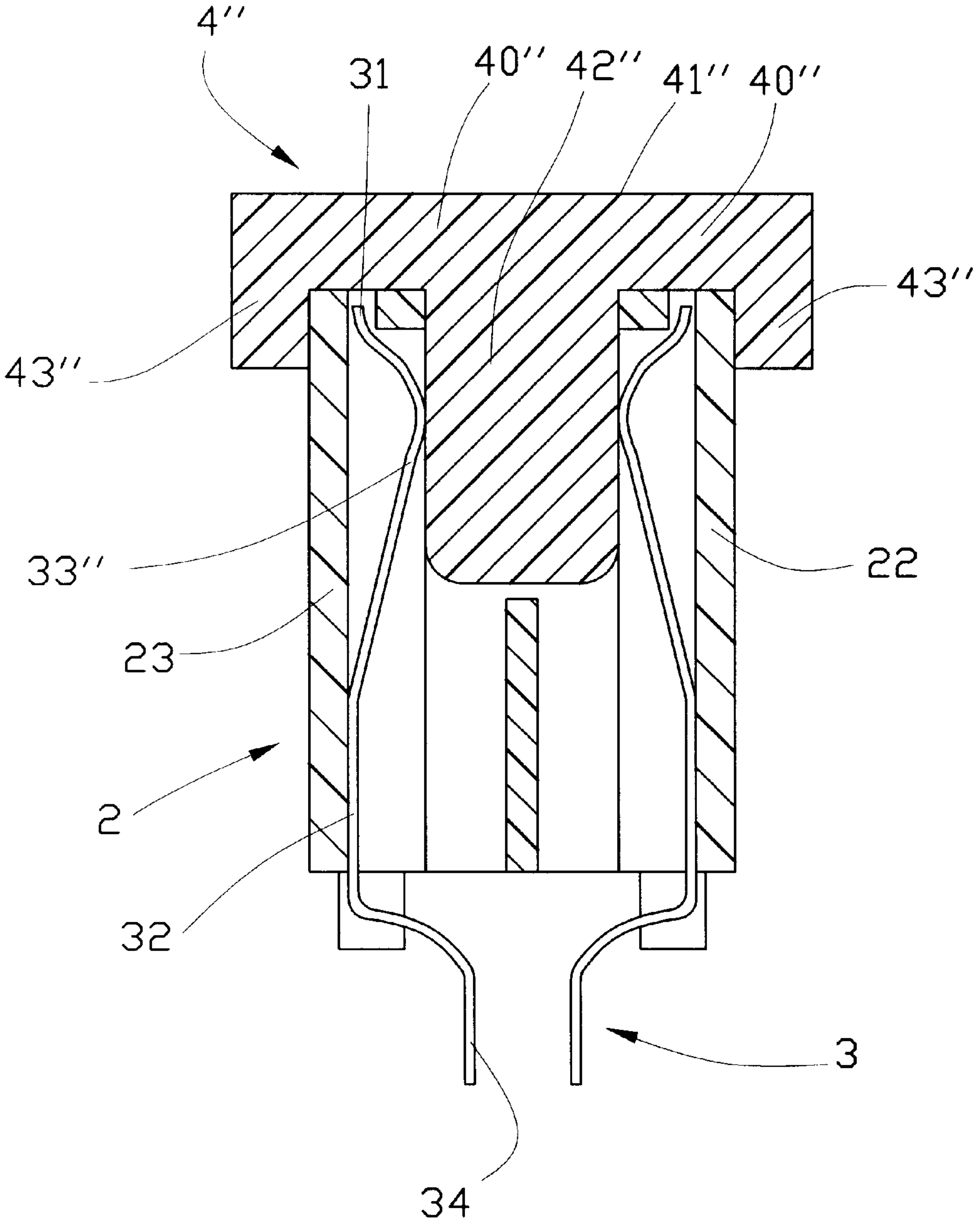
FIG. 4B is a cross-sectional view of the electrical connector of the third embodiment with the switch key inserted therein.

The embodiments illustrated in FIGS. 1–3 disclose pin pairs having a normally open configuration. It is also possible to construct a connector having pin pairs with a normally closed configuration in accordance with the present invention as shown in FIGS. 4A and 4B. In the embodiment illustrated in FIG. 4A, the pin pair 3 associated with the transverse slot 25, 26 comprises arcuate sections 33" contacting each other thereby forming a normally closed configuration. The switch key, which is now designated by reference numeral 4". comprises a T-shaped body 41" having a base 42" insertable into the key way 27 of the slot 21 of the casing 2 to separate the pins of the pin pair 3 from each other thereby transmitting a signal to the mother board to determine the voltage supplied to the connector 1. The switch key 4" comprises two opposite arms 40" forming a flange 43" on free ends thereof.

Although the present invention has been described with reference to preferred embodiments thereof, it is apparent to those skilled in the art that there are a variety of modifications and changes that may be made without departing from the scope of the present invention which is intended to be defined by the appended claims.

What is claimed is:

1. An electrical connector adapted to be mounted to a main circuit board for selectively connecting one of a first daughter circuit board having at least one notch defined at a first position and a second daughter circuit board having at least one notch defined at a second position to the main circuit board, the first position being different from the second position, the connector comprising:

a nonconductive casing having a first face defining an elongate slot therethrough for receiving and retaining a plurality of conductive pins, each pin having one end mounted to the main circuit board, the casing having two side walls located on opposite sides of the elongate slot, two transverse slots being defined in the first face of the casing respectively corresponding to the first and the second positions, each transverse slot being defined by aligned recesses defined in the two side walls, two pairs of additional pins being received in the elongate slot and supported by the two side walls at respective locations corresponding to each of the transverse slots, the pins being spaced from each other and defining a normally open configuration; and a switch key made of nonconductive material and selectively receivable in one of the transverse slots to be selectively received in the notch of the corresponding one of the daughter circuit boards to allow the daughter circuit board to be fit into the connector so that the daughter circuit board is electrically engaged with the pins and establishes an electrical connection with the main circuit board, said switch key comprising a base section fit into the elongate slot, a conductive member being fixed to the base section of the switch key and engageable with a corresponding additional pins to electrically connect the additional pins together.

2. The electrical connector as claimed in claim 1, wherein each of the daughter circuit boards comprises a third notch at a common third position and wherein the casing comprises a block formed in the elongate slot at a position corresponding to the third position and receivable into the third notch of the daughter circuit boards.

3. The electrical connector as claimed in claim 1, wherein the base section of the switch key has a free end and wherein the conductive member comprises a U-shaped body fit over the free end of the base section.

4. The electrical connector as claimed in claim 1, wherein the base section of the switch key comprises a central bore into which the conductive member is fit, the conductive member comprising two sideways projections engageable by the additional pins to electrically connect the pins together.

5. The electrical connector as claimed in claim 1, wherein the casing comprises a pair of additional pins received in the elongate slot and respectively supported by the two side walls at a location corresponding to each of the transverse slots, the pins contacting with each other and having a normally closed configuration, and wherein the switch key comprises a base section fit into the elongate slot to cease engagement of the additional pins and separate the pins from each other.

6. The electrical connector as claimed in claim 1, wherein the switch key comprises two arms respectively received in and supported by the aligned recesses of the side walls.

7. The electrical connector as claimed in claim 6, wherein each of the arms forms a flange on a free end thereof for engaging an outside surface of the corresponding side wall of the casing.

8. An electrical connector for selectively connecting one of a first type daughter circuit board with at least one notch at a first position and a second type daughter circuit board with at least another notch at a second position, said first position being different from the second position, the connector comprising a casing defining an elongate slot for receiving either daughter circuit board, said casing defining a first region and a second region respectively corresponding to said first and second positions of the daughter circuit boards, a switch key comprising a pair of pins being moveably disposed in one of the first and second regions, said switch key changing the electrical operation status of one of said first and second regions, said pins being spaced from each other before being assembled with the switch key, while being electrically connected with each other by a conductive member attached to the switch key, after assembly with the switch key.

9. The electrical connector as claimed in claim 8, wherein said pin pair are engaged with each other before assembled with the switch key, while are disengaged from each other after assembled with the switch key.

10. An electrical connector adapted to be mounted to a main circuit board for selectively connecting one of a first daughter circuit board having at least one notch at a first position and a second daughter circuit board having at least another notch at a second position, the first position being different from the second position, the connector comprising an insulative casing defining an elongated central slot for receiving therein either one of said daughter circuit boards, the casing having two side walls by two sides of the central slot, at least two transverse recesses formed in a top face of the casing in a spatial relation with each other corresponding to the first position and the second position of the daughter circuit boards, each of said recesses extending through the side walls in a lateral direction perpendicular to said central slot, a switch key including a base receivably blocking within the central slot, and at least one associated arm integrally formed with said base and selectively supportably receivable in one of said two transverse recesses, wherein a flange formed at an end of said arm, is exposed to an exterior beside the corresponding side wall of the casing.

* * * * *